United States Patent Office.

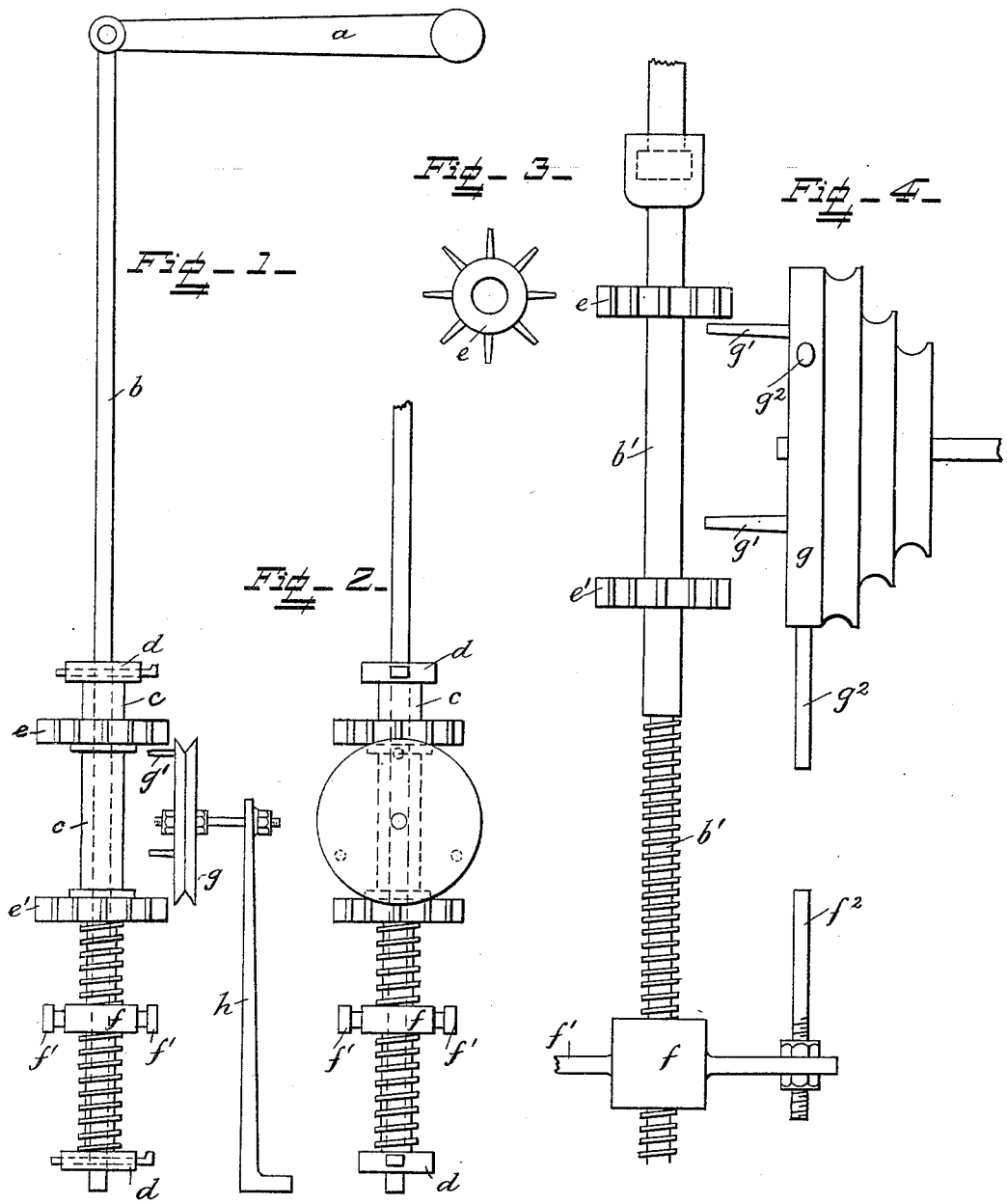

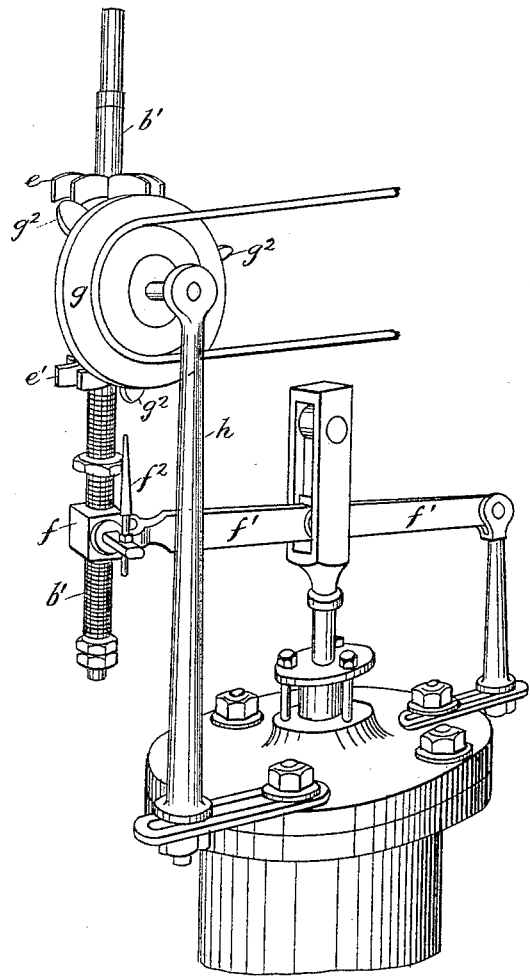

JOSHUA HOYLE AND JOHN HARRISON, OF OLDHAM, ENGLAND.

SPEED-GOVERNOR.

SPECIFICATION forming part of Letters Patent No. 439,513, dated October 28, 1890.

Application filed March 13, 1890. Serial No. 343,738. (No model.) Patented in England July 28, 1888, No. 10,971.

*To all whom it may concern:*

Be it known that we, JOSHUA HOYLE and JOHN HARRISON, residing at Oldham, in the county of Lancaster, England, subjects of the Queen of Great Britain and Ireland, have invented new and useful Improvements in Mechanism for Regulating the Speed of Steam-Engines, (for which we have obtained a patent in Great Britain, No. 10,971, bearing date July 28, 1888,) of which the following is a specification.

Our invention consists in certain improvements in mechanism for regulating the admission of steam to an engine.

We apply our improved mechanism to a rod which connects the governor-lever to a lever for actuating the throttle or other valve, as hereinafter described, and illustrated in the accompanying drawings.

Figure 1 is a side elevation, and Fig. 2 an end elevation, of our improved mechanism. Fig. 3 is a plan of one of the star-wheels, and Fig. 4 illustrates a device which we may employ to prevent the mechanism over-winding.
Fig. 5 represents a perspective view of our improved regulating mechanism applied to a throttle-valve.

In the views, $a$ designates the governor-lever, $b$ the rod which connects the same with the throttle-valve lever, and $c$ is a sleeve mounted loosely thereon and kept from sliding by two collars $d\ d$, fixed adjustably on such rod $b$.

$e\ e'$ are two star-wheels fixed on the sleeve $c$. $f$ is the nut formed in the cross-head on the throttle-valve lever $f'$, and which works on the lower threaded portion of the sleeve $c$.

$g$ is the grooved pulley, with pegs $g'$ on its side face. This pulley is mounted on a stud carried by an adjustable bracket or standard $h$, and is driven by a band from a pulley on the fly-wheel shaft or other shaft. (Not shown.)

Instead of the pulley $g$ with a single groove, as shown in Fig. 1, we may employ a cone-pulley $g$ with two or more grooves, as shown in Fig. 4, and drive this pulley by a band and corresponding cone-pulley on the shaft, so as to be able to vary the speed of the pulley $g$, as desired.

When the engine is running at its normal speed, the pegs $g'$ on the grooved pulley $g$ are clear of both the star-wheels $e\ e'$; but when the speed of the engine varies the rod $b$ is moved by the governor-lever $a$, and one or other of the star-wheels $e$ or $e'$ engages and is driven by the pegs $g'$ on the revolving pulley $g$, whereby the sleeve $c$ is turned, thus screwing the nut $f$ up or down and operating the valve-lever $f'$ and regulating the admission of steam to the engine.

We may dispense with the tube or sleeve $c$ and divide the rod $b$ by a swivel-joint to allow one portion of it to revolve. In this case the pair of star-wheels $e\ e'$ would be mounted on that end of the rod which is free to revolve, and which has a screw-thread cut upon it.

To prevent over-winding we have a projection or projections $g^2$ on the face of the pulley or peg wheel $g$, (see Fig. 4,) and have a blade or projection $f^2$, secured adjustably to the cross-head $f$, by which the rod $b$ is connected to the valve-lever $f'$, so that after one of the star-wheels $e$ or $e'$ (in this case secured to a screwed rod $b'$) had been moved a certain distance in one direction by the revolving pulley or peg wheel $g$, the projection $g^2$ on the latter would come in contact with the blade or projection $f^2$ on the cross-head $f$, and so stop the revolving motion of the peg-wheel $g$ and prevent over-winding.

What we claim as our invention, and desire to secure by Letters Patent, is—

1. The combination, with a continuously-revolving disk, having pins projecting sidewise from its face, of the two star-wheels connected together and operatively connected with the speed-governor, a screw connected to said star-wheels, and a lever for operating the steam-valve and provided with a nut engaging with said screw, whereby the star-wheels may be moved into positive connection with the said revolving disk when moved a certain distance by the speed-governor, substantially as and for the purpose set forth.

2. The combination, with a continuously-revolving disk, having pins projecting sidewise from its face, of the two star-wheels connected together and operatively connected with the speed-governor, a screw connected to said star-wheels, a lever for operating the steam-valve and provided with a nut engaging with said screw, whereby the star-wheels may be moved into positive connection with the said revolving disk when moved a certain distance by the speed-governor, and a blade connected to the said lever and adapted to arrest the motion of the said revolving disk when the said nut has moved a prearranged distance upon the screw, substantially as and for the purpose set forth.

In testimony whereof we affix our signatures to the foregoing specification.

JOSHUA HOYLE.
JOHN HARRISON.

Witnesses:
GEORGE BOOTH,
JOHN THOMAS BROADBENT.